Figure 1:
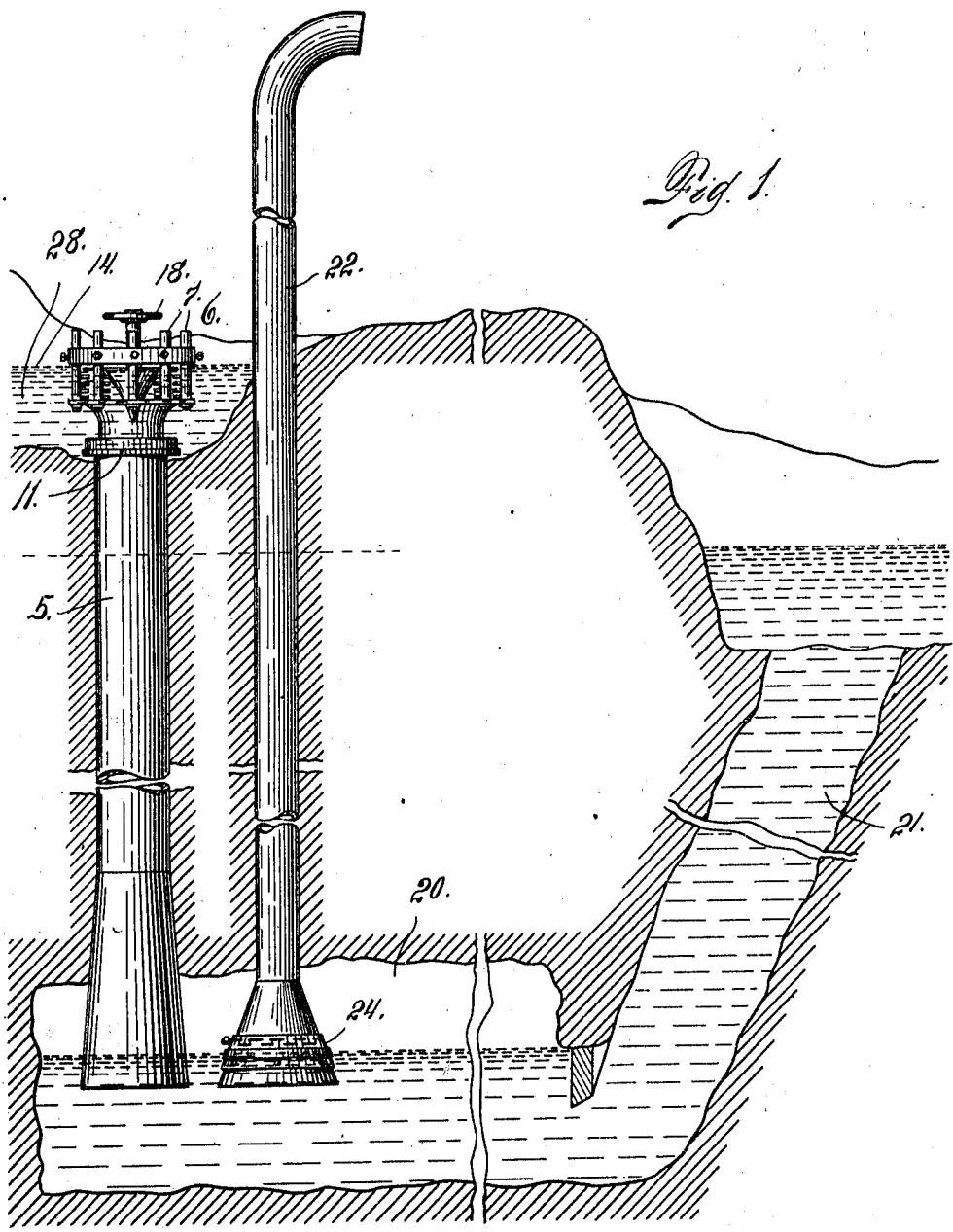

O. A. ROED.
WATER ELEVATING APPARATUS.
APPLICATION FILED NOV. 1, 1909.
969,727.
Patented Sept. 6, 1910.
2 SHEETS—SHEET 2.
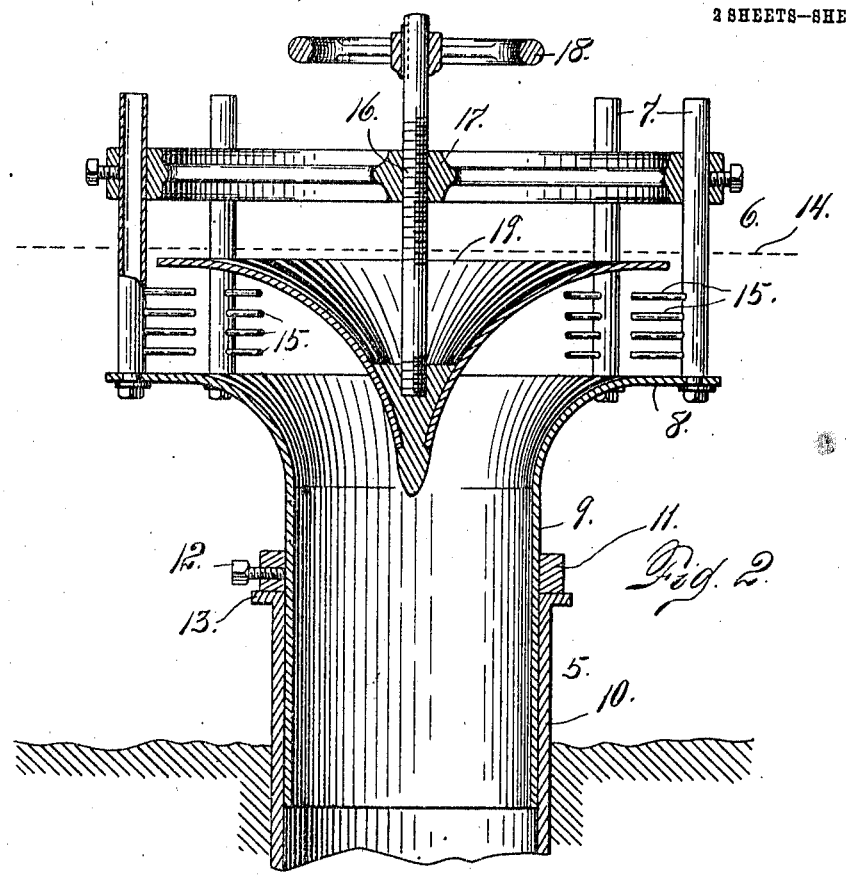
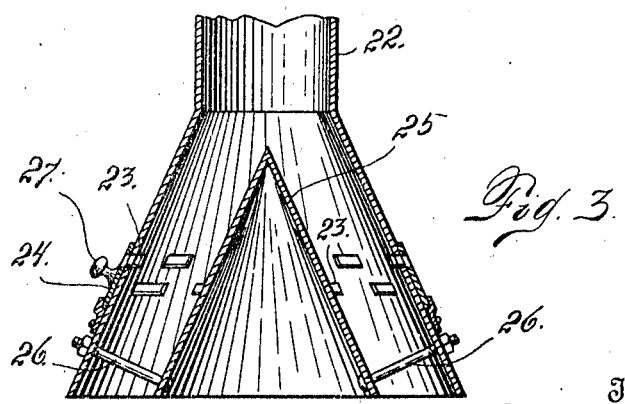
Witnesses
Otto E. Hoddick.
J. D. Thornburgh.
Inventor
Olaf A. Roed.
By C. J. O'Brien.
Attorney

UNITED STATES PATENT OFFICE.

OLAF A. ROED, OF DENVER, COLORADO.

WATER-ELEVATING APPARATUS.

969,727.    Specification of Letters Patent.    Patented Sept. 6, 1910.

Application filed November 1, 1909. Serial No. 525,652.

*To all whom it may concern:*

Be it known that I, OLAF A. ROED, a citizen of the United States, residing in the city and county of Denver and State of Colorado, have invented certain new and useful Improvements in Water-Elevating Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for elevating water and consists in utilizing air compressed in a subterranean cavity, the top of which is located below the outlet for a source of water supply to the said cavity. The water from the source passes downwardly through a pipe whose upper extremity is immersed in the water of the source and whose lower extremity is immersed in the water of the subterranean chamber, projecting considerably below the top of the chamber, in order to leave an air space, while the lower extremity of the pipe is still submerged. The upper extremity of the said pipe is equipped with air tubes whose upper extremities are in communication with the atmosphere, while their lower portions are submerged in the water of the source and equipped with open-ended tubes, whereby as the water passes downwardly through the pipe, air is drawn into the water and mingles therewith until it reaches the subterranean cavity, when it separates from the water, rises in the upper part of the cavity and forces the water downwardly. The water is raised through a standpipe whose lower extremity is also submerged in the water of the subterranean chamber and whose upper extremity terminates at the elevation to which it is desired to raise the water. The lower portion of this standpipe, at some distance above the bottom thereof, is perforated so that when the water in the chamber is depressed, as the air pressure increases, sufficiently to uncover these perforations, the compressed air will enter the standpipe and rise upwardly therein carrying the water with it, to any desired height. By virtue of the fact that the air under pressure in the subterranean chamber, enters the standpipe, and mingles with the water reducing the specific gravity of the latter, it becomes practicable to advantageously elevate water and other liquids by the use of my improved apparatus.

Having briefly outlined my improved construction, I will proceed to describe the same in detail, reference being made to the accompanying drawing, in which is illustrated an embodiment thereof.

In this drawing: Figure 1 is a section cutting a subterranean chamber showing the two pipes of the apparatus in place. Fig. 2 is a sectional view of the upper part of one of the downflow pipes shown on a larger scale. Fig. 3 is a section of the lower extremity of the standpipe shown on a larger scale.

The same reference characters indicate the same parts in all the views.

Let the numeral 5 designate a downflow pipe whose upper extremity is equipped with a framework 6, having air tubes 7, whose extremities are always in communication with the atmosphere. The lower extremities of these tubes are connected with the outer edge 8 of the outwardly-flared top of the downflow pipe 5. It may be stated that this upper portion 9 of the downflow pipe is separate from the body 10 of the pipe and inserted in the top thereof, being provided with a collar 11, secured by a set bolt 12 and resting on the top flange 13 of the body 6 of the downflow pipe. The tubes 7 are equipped below the water level 14 with relatively small pipes 15, which it may be assumed are always submerged in the water. Centrally mounted on the frame 6, is a screw shaft 16 threaded in a central hub 17, mounted on the framework 6. The upper extremity of this shaft is provided with a hand wheel 18, while its lower extremity is connected with a funnel-shaped member 19, whose outer portion extends above the small air pipes 15. As shown in the drawing (see Fig. 2), this cone-shaped member is located entirely below the water level of the supply source. As the water flows downwardly through the pipe 5, there is sufficient suction to cause air to enter the upper extremities of the pipes 7 and pass out into the water through the small tubes or pipes 15. This air is carried downwardly with the water which enters the subterranean chamber 20, fills the latter and overflows through an upwardly-extending outlet 21, the said outlet terminating above the top of the subterranean chamber and sufficiently below the level of the source of supply to give the necessary head for working purposes. The bottom or lower portion of the downflow pipe 5 is frustum-shaped, being largest at its lower extremity, which is located within the chamber 20.

The standpipe 22 has its lower extremity frusto-conical in shape, protruding into the chamber 20, and extending a considerable distance below the top of the chamber. The funnel-shaped portion of the lower extremity of the standpipe is perforated, as shown at 23, the perforations being controlled by a slidable band 24. Within the central part of the funnel-shaped lower extremity of the standpipe, is located a cone-shaped spreader 25, whereby the water is constantly confined between the outer walls of the funnel-shaped part and the centrally-located spreader. This spreader is connected with the body of the pipe by bolts 26. The slidable band or valve 24 is equipped with a manipulating handle or knob 27, for the purpose of adjustment.

When it is desired to raise water by the use of my improvement, the parts constituting the apparatus are arranged, as shown in Fig. 1. In this event the water from a source 28 of natural supply, flows downwardly through the downflow pipe 5, into the chamber 20. As the chamber fills with water, whereby the lower extremities of the two pipes are submerged, air which is drawn from the atmosphere into this water, rises into the top of the chamber above the water and being trapped, accumulates therein whereby it is subjected to compression and forces the water downwardly in the said chamber until the perforations 23 in the lower extremity of the standpipe are uncovered after which the air enters these openings and is under sufficient pressure to elevate the water and cause it to overflow at the upper extremity of the standpipe.

Having thus described my invention what I claim is:

1. The combination with a subterranean chamber and a water supply source above the chamber, the latter having an outlet above the top of the chamber but below the source of supply, of an open-ended conduit extending downwardly from the source of supply, its lower extremity protruding into the chamber, the upper extremity of the pipe being equipped with means for introducing air into the water by suction due to the downflow from the source, and a standpipe whose lower end is open and protruding into said chamber, the lower portion of the standpipe within the chamber being perforated for the entrance of air, after the air pressure has forced the water in the chamber downward to uncover said openings.

2. The combination with a source of water supply and a subterranean chamber below said source, and having an outlet above the top of the chamber, of a downflow pipe whose extremities are respectively submerged in the source of supply and the water of the chamber, the upper extremity of the said pipe being equipped with means for introducing air into the water by suction due to the downflow in the pipe, and an open-ended standpipe whose lower extremity protrudes into the chamber, its lower portion being perforated for the admission of air from the chamber after the water in the chamber has been forced downwardly by the accumulated air pressure, the lower extremity of the standpipe being frustum-shaped and having a centrally-located, cone-shaped projection.

3. In an apparatus for elevating water, the combination with a source of water supply and a subterranean chamber below said source, the said chamber having an outlet above the top of the chamber, of a downflow pipe reaching from the source of water supply into the subterranean chamber, the upper extremity of the said pipe being equipped with means for introducing air into the water by suction, due to the downflow in the pipe, and a standpipe having its lower extremity protruding into the said chamber and open for the entrance of water, the lower portion of the pipe being equipped with perforations for the entrance of air after the accumulated air pressure has forced the water downwardly in the chamber to uncover said openings, and means for regulating the size of the openings available for the entrance of air.

4. In water-elevating apparatus, the combination with a source of water supply and a subterranean chamber below said source and having an outlet between the source of supply and above the top of the chamber, a downflow pipe whose upper extremity is submerged in the water source and equipped with means for introducing air into the water by suction due to the downflow in the pipe, the lower extremity of the said pipe protruding into the said chamber, a suitable distance below the top thereof, and an open-ended standpipe whose lower extremity protrudes into the said chamber and is perforated near its lower extremity to permit the entrance of air after the water in the chamber has been pressed downwardly by the accumulated air pressure, sufficiently to uncover the said openings, and a device slidable on the pipe for controlling the size of the openings available for the entrance of air, the upper extremity of the standpipe projecting above the source of water supply for the purpose set forth.

In testimony whereof, I affix my signature in presence of two witnesses.

OLAF A. ROED.

Witnesses:
A. J. O'BRIEN.
A. EBERT O'BRIEN.